US008422068B2

(12) United States Patent (10) Patent No.: US 8,422,068 B2
Hasegawa et al. (45) Date of Patent: Apr. 16, 2013

(54) IMAGE PROCESSOR FOR AUTOMATICALLY FITTING EXTRACTED FRAME IMAGES ON A PAGE

(75) Inventors: Tomohiko Hasegawa, Nagoya (JP); Masaki Kondo, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1055 days.

(21) Appl. No.: 12/413,498

(22) Filed: Mar. 27, 2009

(65) Prior Publication Data

US 2009/0244394 A1 Oct. 1, 2009

(30) Foreign Application Priority Data

Mar. 31, 2008 (JP) .................. 2008-094129

(51) Int. Cl.
  *G06K 15/00* (2006.01)
  *H04N 9/64* (2006.01)
(52) U.S. Cl.
  USPC .......................................... 358/1.18; 348/715
(58) Field of Classification Search .................. None
  See application file for complete search history.

(56) References Cited

U.S. PATENT DOCUMENTS

| | | | |
|---|---|---|---|
| 5,706,097 A | 1/1998 | Schelling et al. | |
| 2003/0052986 A1 | 3/2003 | Matsumoto | |
| 2006/0050321 A1 | 3/2006 | Takahashi | |
| 2006/0132637 A1* | 6/2006 | Imanura | 348/333.01 |
| 2008/0007783 A1* | 1/2008 | Terada | 358/1.18 |

FOREIGN PATENT DOCUMENTS

| | | | |
|---|---|---|---|
| JP | H09-116853 A | 5/1997 | |
| JP | H09-322113 A | 12/1997 | |
| JP | 2000-138883 A | 5/2000 | |
| JP | 2005-130254 A | 5/2005 | |
| JP | 2006-080652 A | 3/2006 | |

OTHER PUBLICATIONS

JP-2000138883-translation, Suzuki, May 16, 2000.*
European Patent Office, Extended European Search Report in counterpart Patent Application No. EP 09250888.6, mailed Nov. 20, 2009.
European Patent Office, Office Action for European Patent Application No. 09 250 888.6 (counterpart to above-captioned patent application), dated Feb. 15, 2011.
Japan Patent Office, Office Action for Japanese Patent Application No. 2008-094129 (counterpart to above-captioned patent application), mailed Jul. 20, 2010.

* cited by examiner

*Primary Examiner* — Fan Zhang
(74) *Attorney, Agent, or Firm* — Baker Botts L.L.P.

(57) ABSTRACT

An image processor is connectable with a storing medium storing still image data corresponding to a still image and moving image data corresponding to a moving image, the moving image data including a plurality of sets of frame image data corresponding to a plurality of frame images respectively. The image processor includes an outputting unit, an extracting unit, and index image producing unit, and a layout unit. The outputting unit outputs an image list having a first layout area having a first layout size and a second layout area having a second layout size. The extracting unit extracts at least two sets of frame image data from the plurality of sets of frame image data. The index image producing unit produces a first index image from the still image data and a plurality of second index images from the extracted frame image data. The layout unit lays out the first index image in the first layout area and the plurality of second index images in the second layout area.

10 Claims, 13 Drawing Sheets

FIG.5

| 301 | 302 | 304 | 305 | 306 |
|---|---|---|---|---|
| 0 | 0 | 1 | 0 | 1 |
| 1 | 1 | 6 | 0 | 1 |
| 2 | 1 | 6 | 1 | 35 |
| 3 | 1 | 6 | 2 | 110 |
| 4 | 1 | 6 | 3 | 176 |
| 5 | 1 | 6 | 4 | 201 |
| 6 | 1 | 6 | 5 | 484 |
| 7 | 2 | 7 | 0 | 1 |
| 8 | 2 | 7 | 1 | 650 |
| 9 | 2 | 7 | 2 | 711 |
| 10 | 2 | 7 | 3 | 1000 |
| 11 | 2 | 7 | 4 | 1920 |
| 12 | 2 | 7 | 5 | 2500 |
| 13 | 2 | 7 | 6 | 2730 |
| 14 | 3 | 1 | 0 | 1 |

⋮

IMAGE PROCESSOR FOR AUTOMATICALLY FITTING EXTRACTED FRAME IMAGES ON A PAGE

CROSS REFERENCE TO RELATED APPLICATION

This application claims priority from Japanese Patent Application No. 2008-094129 filed Mar. 31, 2008. The entire content of this priority application is incorporated herein by reference.

TECHNICAL FIELD

The present invention relates to an image processor.

BACKGROUND

Since recent digital cameras are equipped to take both video images and still images, the user can determine whether to take still photographs or video image footage based on the scene being filmed. For example, the user would likely take a still image of a scene with no motion, such as a group photo, and would likely take video image of a scene with motion, such as an activity at a sports event.

Devices have also been proposed for selectively printing out still images and video images taken with this type of digital camera or for displaying such images on a display unit (see Japanese unexamined patent application publications Nos. 2005-130254 and HEI-9-322113, for example).

SUMMARY

However, the device described above cannot output a list of image that can be easily browsed by a user, such that the user can find a desired image quickly from the video images and still images.

In view of the above-described drawbacks, it is an objective of the present invention to provide an image processor that can output an image list, which is easy to view at a glance.

In order to attain the above and other objects, the present invention provides an image processor including an outputting unit, an extracting unit, and index image producing unit, and a layout unit. The image processor is connectable with a storing medium storing still image data corresponding to a still image and moving image data corresponding to a moving image. The moving image data includes a plurality of sets of frame image data corresponding to a plurality of frame images respectively. The outputting unit outputs an image list having a first layout area having a first layout size and a second layout area having a second layout size. The extracting unit extracts at least two sets of frame image data from the plurality of sets of frame image data. The index image producing unit produces a first index image from the still image data and a plurality of second index images from the extracted frame image data. The layout unit lays out the first index image in the first layout area and the plurality of second index images in the second layout area.

BRIEF DESCRIPTION OF THE DRAWINGS

The particular features and advantages of the invention as well as other objects will become apparent from the following description taken in connection with the accompanying drawings, in which:

FIG. 5 is a conceptual diagram showing a structure of a layout data storage area;

DETAILED DESCRIPTION

Figure 1:
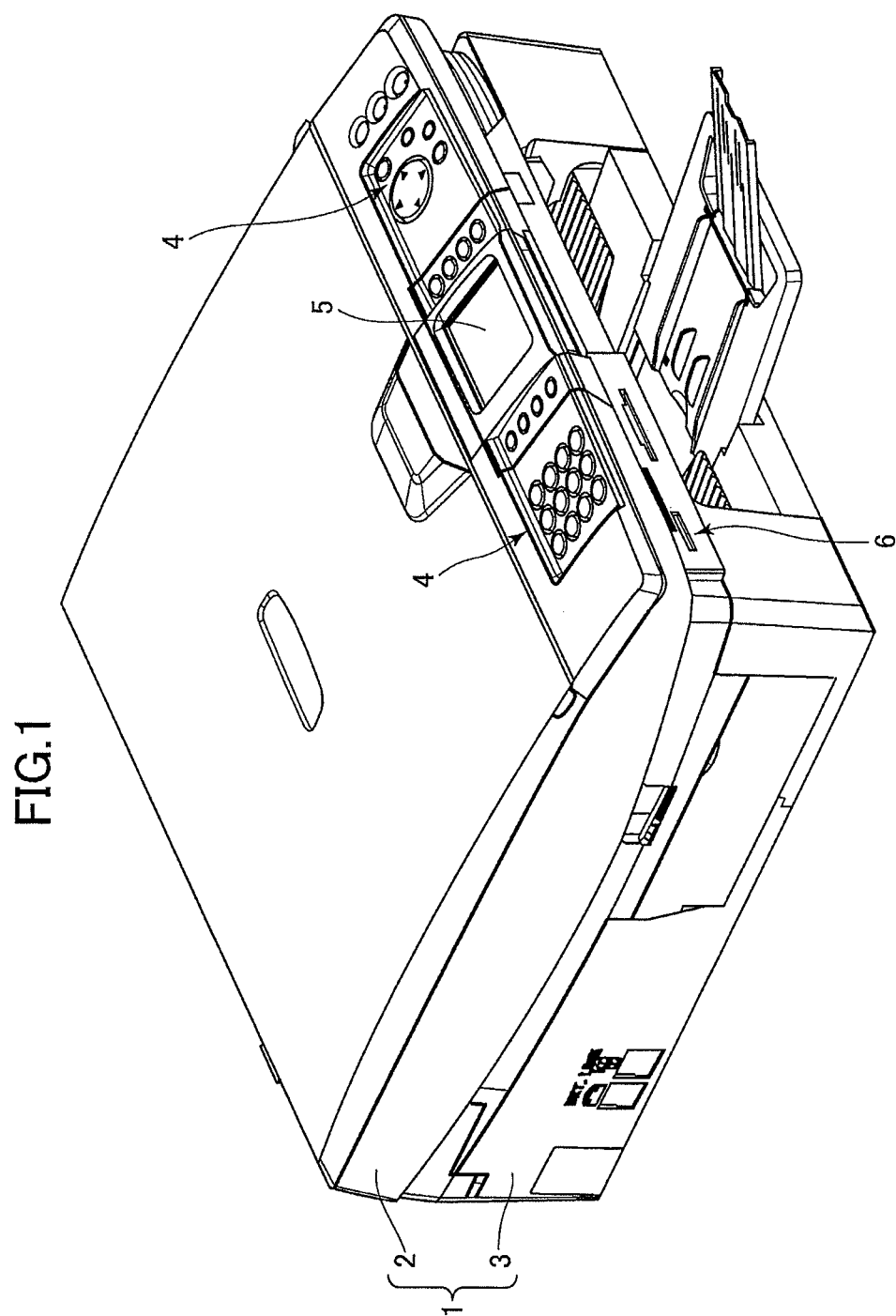
FIG. 1 is a perspective view showing an external structure of an MFP according to an embodiment.

FIG. 1 is a perspective view showing an external structure of a multifunction peripheral (hereinafter abbreviated as "MFP") 1 as an embodiment of the image processor according to the present invention.

The MFP 1 is provided with multiple functions, including a photocapture function, a copier function, a scanner function, and a media capture function. Through the media capture function, the MFP 1 can execute processes for reading image files from a media card mounted in a slot section 6 described later and for printing out these image files, for displaying images on an LCD 5 described later corresponding to image files read from the media card, and for saving image files scanned by the scanner function on the media card.

As will be described later, a particular feature of the MFP 1 according to the preferred embodiment is its ability to output a list of images that can be easily browsed by a user, enabling the user to readily see what image files are stored on the media card mounted in the slot section 6.

The MFP 1 houses a scanner 2 in the upper section thereof for scanning original documents, and an inkjet printer 3 disposed beneath the scanner 2 for printing images on recording paper.

The slot section 6 is provided on the front surface of the MFP 1 and includes multiple card slots in which media cards, such as a CompactFlash (registered trademark) card and an SD card can be directly inserted.

The scanner 2 is a flatbed scanner having a document cover. Just forward of the document cover, the MFP 1 is provided with a control panel including an operating section 4 configured of a plurality of keys, and the LCD 5 configured of a touch panel. The MFP 1 displays operating procedures and the status of current processes on the LCD 5 and displays data on the LCD 5 corresponding to operations performed on the operating section 4.

Figure 2:
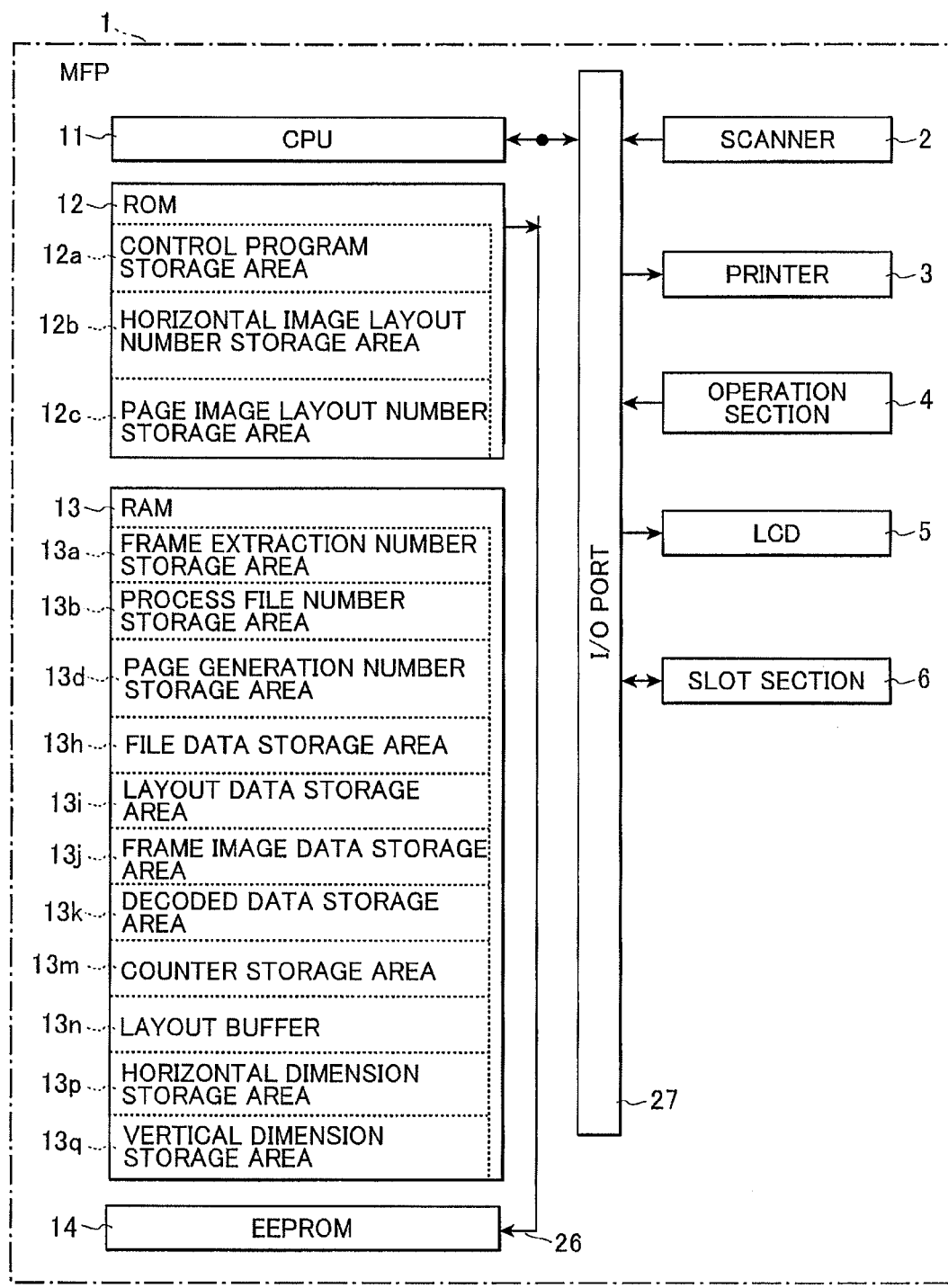
FIG. 2 is a block diagram showing an electrical structure of the MFP.

Next, the electrical structure of the MFP 1 will be described with reference to FIG. 2. FIG. 2 is a block diagram showing the electrical structure of the MFP 1. The MFP 1 primarily includes a CPU 11, a ROM 12, a RAM 13, an EEPROM 14, the scanner 2, the printer 3, the operating section 4, the LCD 5, and the slot section 6.

The CPU 11, ROM 12, RAM 13, and EEPROM 14 are interconnected via a bus line 26. The scanner 2, printer 3, operating section 4, LCD 5, slot section 6, and bus line 26 are also interconnected via an I/O port 27.

The CPU 11 controls the various functions possessed by the MFP 1 and each component connected to the I/O port 27 according to fixed values and programs stored in the ROM 12, RAM 13, and EEPROM 14.

The ROM 12 is a nonvolatile memory capable of preserving stored data even when the power is interrupted. The ROM 12 is provided with a control program storage area 12a, a horizontal image layout number storage area 12b, and a page image layout number storage area 12c. The control program storage area 12a stores control programs executed by the CPU 11 when implementing a layout image printing process described later with reference to the flowcharts in FIGS. 6 through 12.

Figure 3:
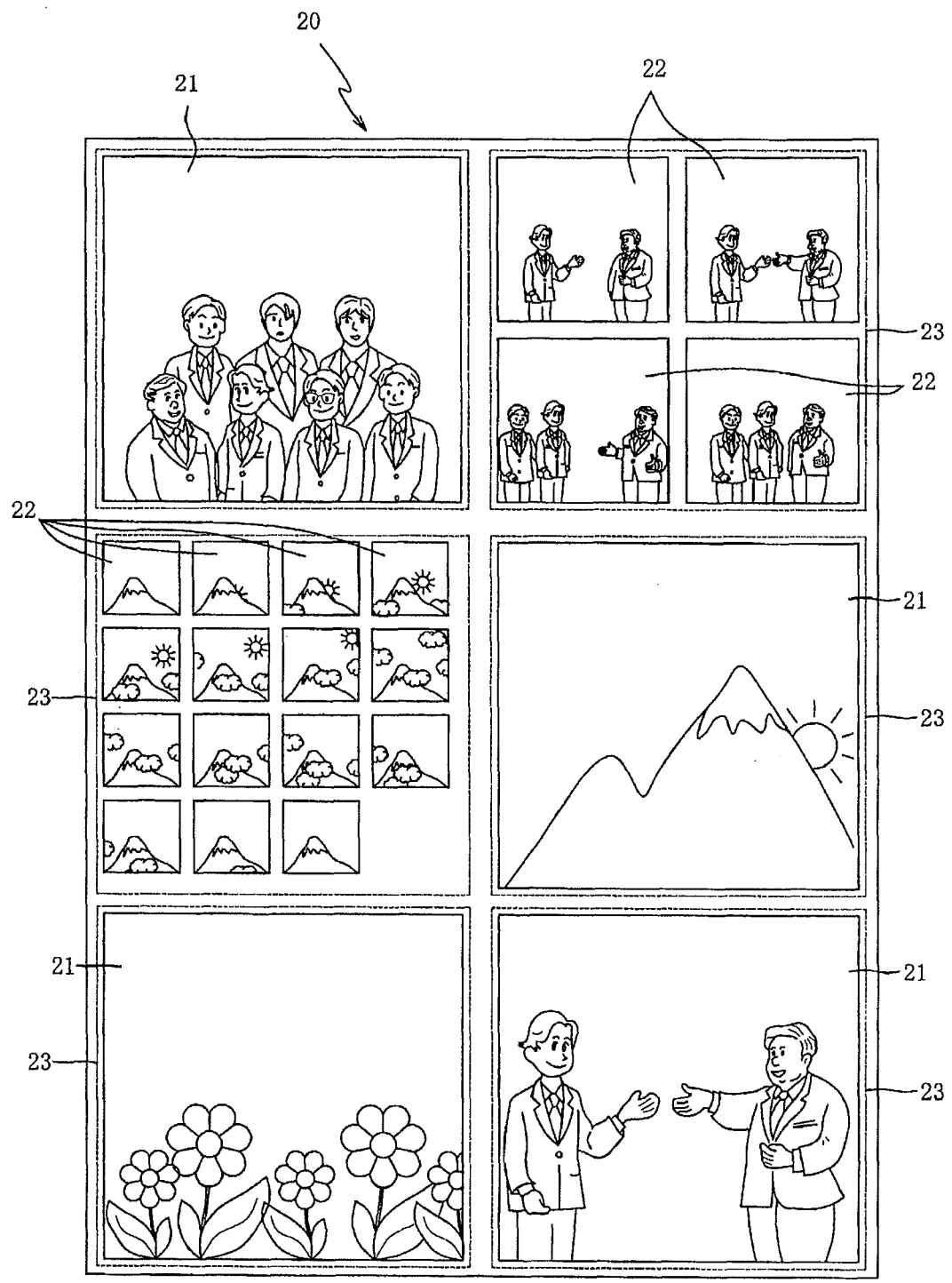
FIG. 3 is a diagram showing an example of an image list.

In the layout image printing process described later, a plurality of image layout areas 23 described later with reference to FIG. 3 is assigned to an image list 20 corresponding to one page of a recording sheet. The image layout areas 23 are allocated to the still image files and video image files that are stored in the media card in one-to-one correspondence. Index image indicating the contents of each image file is laid out in the allocated image layout area 23.

The horizontal image layout number storage area 12b is a memory area for storing a "horizontal layout number" indicating the number of image layout areas 23 that can be horizontally assigned to one recording sheet.

In the MFP 1 of the preferred embodiment, the horizontal image layout number storage area 12b stores a plurality of "horizontal layout numbers" for predetermined paper sizes (L-size, A4-size, letter size, etc.) and printing modes (fine, normal, draft, etc.). When performing the layout image printing process described later, the MFP 1 reads and employs a suitable value from among the plurality of "horizontal layout numbers."

The page image layout number storage area 12c is a memory area for storing a "page layout number" indicating the number of image layout areas 23 that can be assigned to one recording sheet. The page image layout number storage area 12c in the preferred embodiment stores a plurality of "page layout numbers" for predetermined paper sizes and printing modes. In the layout image printing process described later, the MFP 1 reads and employs a suitable value from among these page layout numbers.

The RAM 13 temporarily stores various data produced when the MFP 1 executes various operations. The RAM 13 is provided with a frame extraction number storage area 13a, a process file number storage area 13b, a page generation number storage area 13d, a file data storage area 13h, a layout data storage area 13i, a frame data storage area 13j, a decoded data storage area 13k, a counter storage area 13m, a layout buffer 13n, a video file number storage area, a horizontal dimension storage area 13p, and a vertical dimension storage area 13q.

Here, terminology used in the preferred embodiment will be defined. The term "video image" in the preferred embodiment denotes a moving image reproduced by displaying a plurality of frame images in succession. A "video image file" is a file containing data for playing a video image, such as an AVI video image file or a QuickTime video image file. The video image file may be of any format, provided that the file contains data that can be used to playback video images. Further, the video image is constituted from a plurality of frame images, and "frame image data" in the preferred embodiment denotes data corresponding to a frame image.

The frame extraction number storage area 13a is a memory area for storing a "frame image extraction number" indicating the number of frame images corresponding to frame image data to be extracted from each video image file stored in the media card. If the "frame image extraction number" is "5", for example, the MFP 1 extracts frame image data for five frame images per video image file and lays out five index images per video image file in an image list 20 (see FIG. 3) based on the extracted frame image data.

In the preferred embodiment, the frame extraction number storage area 13a stores an arbitrary value inputted by the user via the operating section 4 as the "frame image extraction number."

The process file number storage area 13b is a memory area for storing a "total number of process files" indicating the total number of still image files and video image files stored in the media card.

Figure 9:
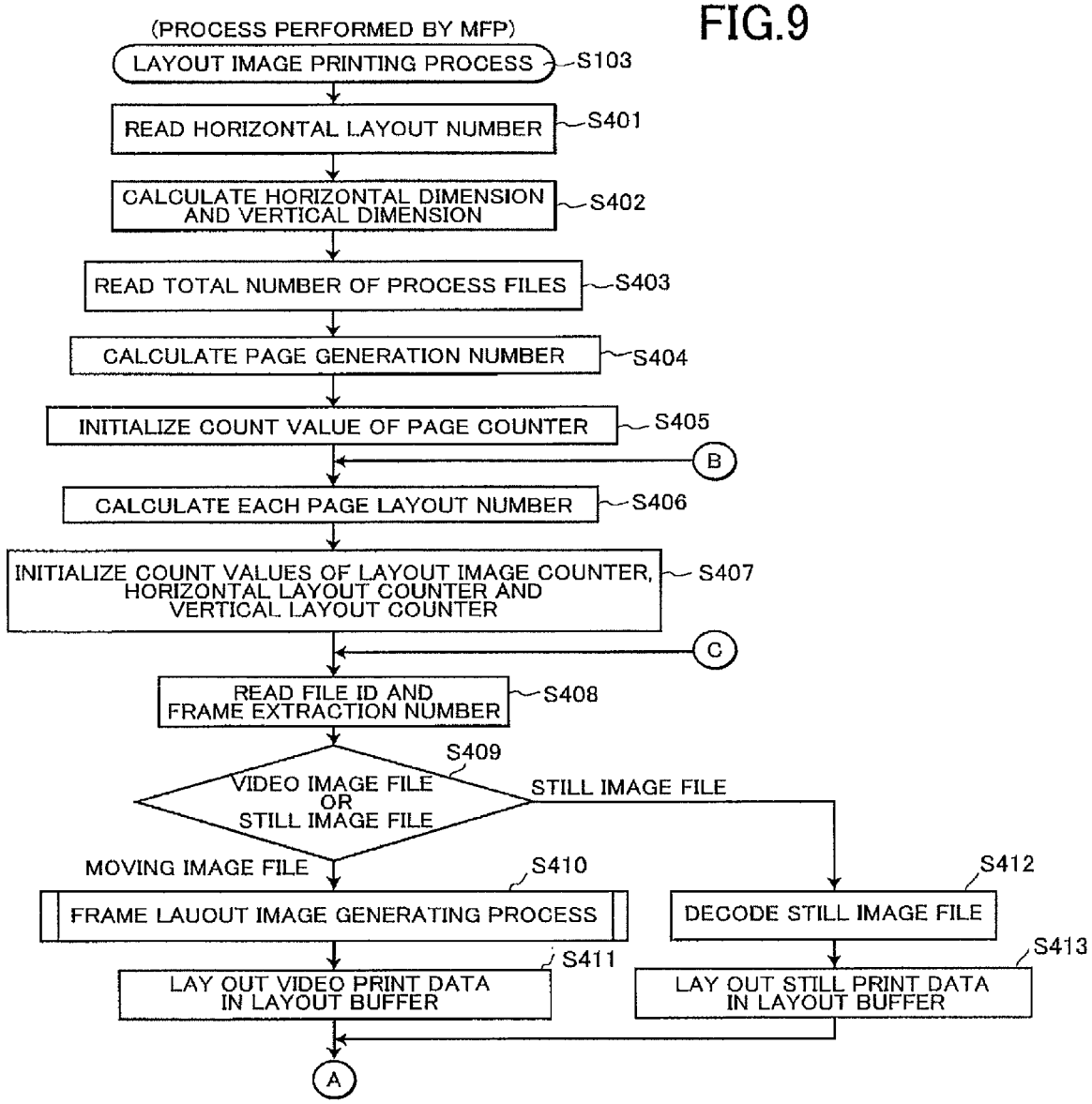
FIG. 9 is a flowchart explaining a layout image printing process.
Figure 11:
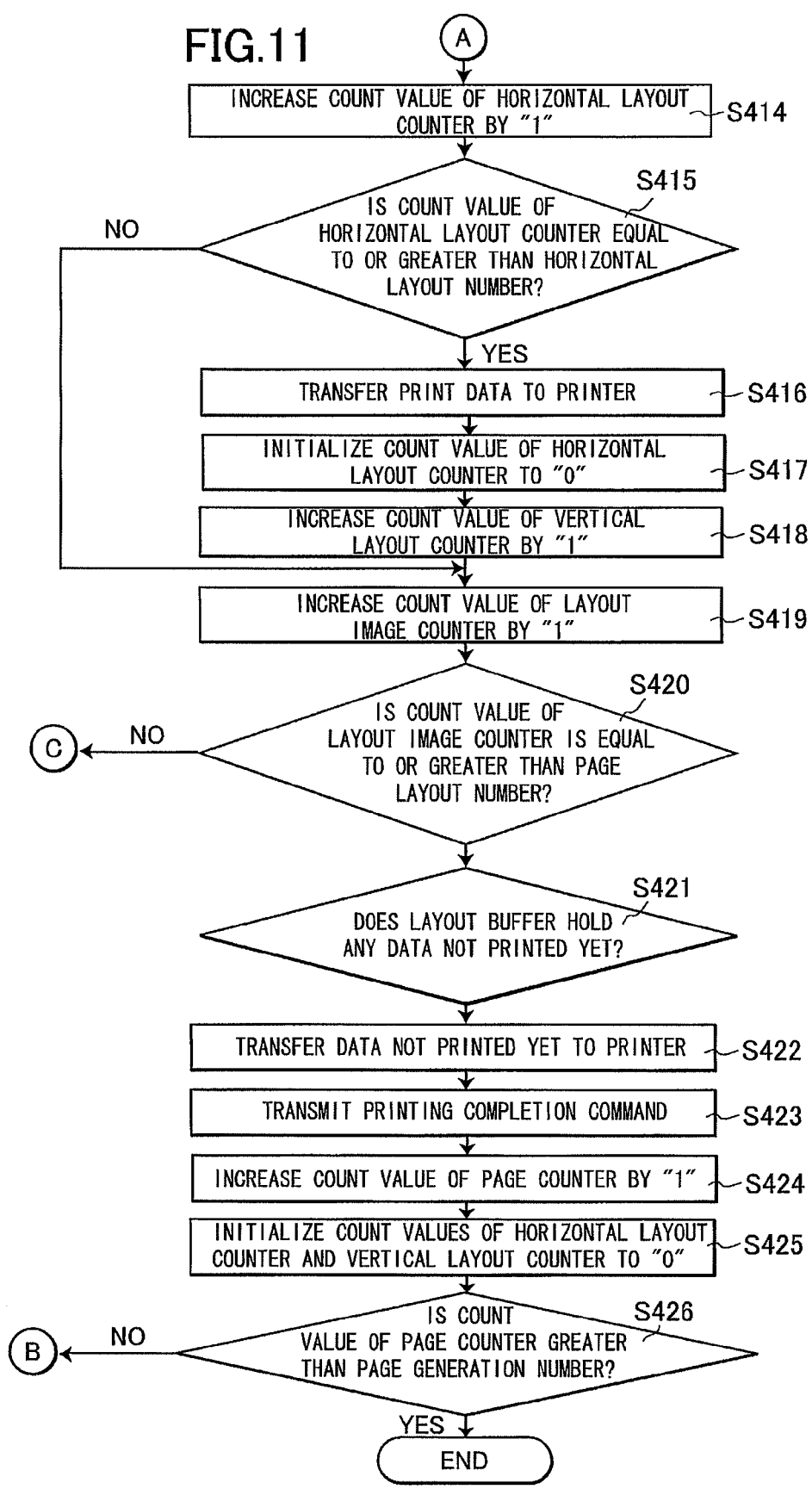
FIG. 11 is a flowchart explaining a process following a layout image printing process shown in FIG. 9.

The page generation number storage area 13d is a memory area storing a "page generation number" indicating the total page number of the image list 20 that is should be generated when the layout image printing process described later with reference to FIGS. 9 and 11 is executed.

The file data storage area 13h and layout data storage area 13i will be described later with reference to FIGS. 4 and 5.

The frame data storage area 13j is a memory area for storing frame image data extracted from a video image file. The decoded data storage area 13k is a memory area for storing decoded frame image data and decoded still image data. The counter storage area 13m is a memory area for storing a file number counter, a layout order counter, frame number counter, layout image counter, horizontal layout counter, vertical layout counter, page counter, horizontal division counter, and vertical division counter described later.

The layout buffer 13n is a memory area for storing print data corresponding to the image layout areas 23 corresponding to one row of the image list 20. The horizontal storage area 13p is a memory area for storing a "horizontal dimension" indicating a horizontal dimension of one image layout area 23. The vertical dimension storage area 13q is a memory area for storing a "vertical dimension" indicating a vertical dimension of one image layout area 23. The EEPROM 14 is a rewritable non-volatile memory.

FIG. 3 is a diagram showing an example of the image list 20 printed out by the MFP 1. As shown in FIG. 3, the image list 20 consists of still index images 21 and video index images 22 that represent the contents of one or more image files stored in the media card.

The MFP 1 sets a plurality of image layout areas 23 on a recording sheet and allocates the video image files or still image files to the image layout areas 23, in one-to-one relationship. In FIG. 3, broken lines define the image layout areas 23 for convenience of explanation. These broken lines need not be shown in the actual image list 20.

A still image corresponding to still image data included in one still image file is enlarged or reduced, and the enlarged or reduced still image is laid out as the still index image 21 in one image layout area 23 to which the source still image file is allocated. Further, some frame images corresponding to frame image data extracted from one video image data are enlarged or reduced, and the enlarged or reduced frame images are laid out as the video index images 22 in one image layout area 23 to which the source video image file is allocated. Thus, the image list 20 is outputted.

Since the video index images 22 corresponding to the frame image data extracted from one video image file (hereinafter referred to as "video index images 22 pertaining to one video image file") are laid out altogether in one image layout area 23, the user can distinguish, at a glance, the still index images 21 from the video index images 22 even if the still index images 21 and the video index images 22 are mixed in the image list 20. Hence, the image list 20 that is easy for the user to view can be output.

Even if the media card stores many video image files, the video index images 22 for one source video image file are laid out together. This enables the user to recognize all video index images 22 pertaining to one video image file as belonging to the same group. Thus, the user can easily find desired images.

Moreover, since the video index images 22 for one source video image file are laid out together, the user can understand temporal changes of the video image file.

The MFP 1 according to this embodiment sets the size of the video index images 22 for each video image file, so that the size is in reverse proportion to the number of the video index images 22 laid out in one image layout area 23, and outputs the image list 20 in which the video index images 22 are laid out at the set size.

That is, the more video index images 22 are laid out in one video image file, the smaller sizes the video image index images 22 will have. Conversely, the fewer video index images 22 are laid out based on one video image file, the larger sizes the video index images 22 will have. Thus, the user can intuitively understand how many video index images 22 have been laid out on the basis of one video image data.

The MFP 1 according to this embodiment is designed to lay out the video index images 22 pertaining to one video image file, in one image layout area 23 at the order they have been generated. The user can therefore view the video index images 22 in the order they have been generated. This helps the user to easily find any desired image.

In the present embodiment, the image layout areas 23 laid on one-page recording sheet are identical in both shape and size. Since the still index images 21 and the video index images 22 are orderly laid out in the list 20 as illustrated in FIG. 3, this makes the image list 20 easier for the user to view and understand even if both still index images 21 and video index images 22 exist on the image list 20. Nonetheless, the image layout areas 23 may have different sizes as needed.

Figure 4:
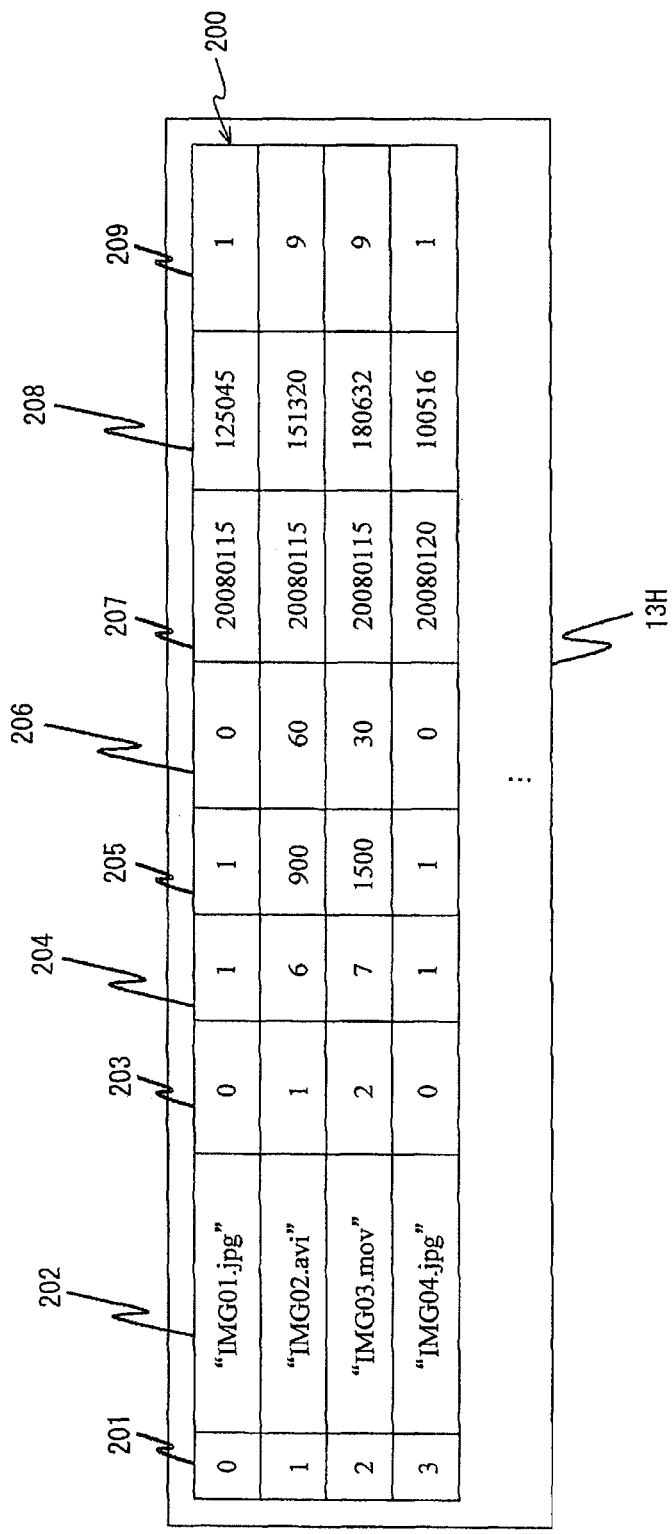
FIG. 4 is a conceptual diagram showing a structure of a file data storage area.

FIG. 4 is a conceptual diagram showing a structure of the file data storage area 13*h*. In the present embodiment, the MFP 1 creates a file data record 200 for each still image file and video image file stored in the media card, and stores the file data record 200 in the file data storage area 13*h* in an image data acquiring process 101 that is one part of the layout image printing process described later.

As shown in FIG. 4, each file data record 200 is configured of a "file ID," "filename," "file type," "frame image extraction number," "fps data," "file date data," "file time data," and "adjunctive file data". The file data storage area 13*h* includes a file ID storage area 201, a file name storage area 202, a file type storage area 203, a frame extraction number storage area 204, a total frame number storage area 205, an fps data storage area 206, a file date data storage area 207, a file time data storage area 208, and an adjunctive file data storage area 209.

The file ID storage area 201 is an address area for storing a "file ID" of each image file, and the file name storage area 202 is an address area for storing a "filename" of each image file. As shown in FIG. 4, an extension is appended to each filename. Examples of extensions appended to filenames are "jpg" for JPEG image files, "avi" for AVI video image files, and "mov" for QuickTime video image files.

The file type storage area 203 is a memory area for storing a "file type" (format) of each image file. The "file type" can be determined from the extension appended to the filename, for example. In the preferred embodiment, the value "0" is stored in the file type storage area 203 if the image file is in the JPEG file format (jpg extension), the value "1" is stored in the file type storage area 203 if the image file is in the AVI video image file format (avi extension), and the value "2" is stored in the file type storage area 203 if the image file is in the QuickTime video image file format (mov extension).

The MFP 1 can determine the "file type" of each image file based on data stored in a few bytes at the beginning of the image file. For example, if the first two bytes at the start of an image file are "0xFFD8," the MFP 1 can detect that the file is a JPEG file. If the first two bytes are "0x424D," the MFP 1 can detect that the file contains bitmap data. Hence, it is feasible to determine the "file type" based on this data.

The frame extraction number storage area 204 is a memory area for storing the "frame image extraction number" described above. In the image data acquiring process 102 describer later, the "frame image extraction number" stored in the frame extraction number storage area 13*a* is read and stored in the frame extraction number storage area 204. If the file is a still image file, the value "1" is stored in the frame extraction number storage area 204. If the file is a video image file, a value inputted by the user is stored in the frame extraction number storage area 204.

The total frame number storage area 205 is a memory area for storing a "total number of frames" included in each image file. If the image file is a video image file, the "total number of frames" included in the video image file is stored in the total frame number storage area 205. If the image file is a still image file, the value "1" is always stored in the total frame number storage area 205.

The fps data storage area 206 is a memory area for storing "fps (frames per second) data" included in each image file. If the image file is a still image file, the value "0" is stored in the "fps data storage area 206. If the image file is a video image file, the value such as "60" or "30" indicating that the video image is played at a rate of 60 frames per second or 30 frames per second, is stored in the fps data storage area 206, respectively.

The file date data storage area 207 is a memory area for storing "file date data" indicating the date that each image file was captured; for example, the capture date "Jan. 15, 2008" is represented with the "file date data" "20080115."

The file time data storage area 208 is a memory for storing "file time data" indicating the time that each image file was captured; for example, the capture time "12:50:45," where "12" indicates the hour, "50" the minutes, and "45" the seconds, is expressed with the file time data "125045." If the image file is a video image file, data indicating the start time for video image capture is stored as the "file time data."

In the following description, it will be assumed that the "total number of frames," "fps data," "file date data," and "file time data" are acquired by extracting data from the header of each image file, but this data may be acquired by other means.

The adjunctive file data storage area 209 is a memory area for storing an "image layout area division number" indicating the division number of the image layout area 23 allocated to each image file.

FIG. 5 is a conceptual diagram showing a structure of the layout data storage area 13*i*. The MFP 1 creates, based on the file data record 200 stored in the file data storage area 13*h*, a layout data record 300 for each still image and each frame included in each video image file stored in the media card, and stores the layout data record 300 in the layout data storage area 13*i* in a layout data determining process 102 that is one part of the layout image printing process described later.

As shown in FIG. 5, each layout data record 300 is configured of a "layout order," the "file ID," "frame image extraction number," an "extraction frame ordinal number," and a "frame extraction position." The layout data storage area 13*i* includes a layout order storage area 301, a file ID storage area 302, a frame extraction number storage area 304, an extraction frame ordinal number storage area 305, and a frame extraction position storage area 306.

The layout order storage area 301 is an area for storing a "layout order" of each frame. In the layout image printing process 102 described later, still-image index images 21 and video image index images 22 identified by the layout data records 300 are laid out in the image list 20 at the "layout order" stored in the layout order storage area 301.

The file ID storage area 302 is an area for storing a "file ID" of the image file to which each frame belongs. Since a file ID is stored in the file data storage area 13h in association with for a filename as shown in FIG. 4, the image file can be identified from the file ID.

The frame extraction number storage area 304 is an area for storing the "frame image extraction number" described above. In the layout data determining process 102 described later, the "frame image extraction number" stored in the frame extraction number storage area 204 is read and stored in the frame extraction number storage area 304.

The extraction frame ordinal number storage area 305 is an area for storing an "extraction frame ordinal number" of each frame. If the image file is a video image file, a plurality of frames is extracted and can be laid out in the image list 20 as video image index images 22 at an order. Hence, the extraction frame ordinal number storage area 305 stores the "extraction frame ordinal number" indicating the ordinal number of each extracted frame.

The frame extraction position storage area 306 is an area for storing a "frame extraction position" of each frame. If the image file is a still image file, the frame extraction position storage area 306 stores "1" as the "frame extraction position." If the image file is a video image file, the frame extraction position storage area 306 stores the "frame extraction position" indicating an arranged number of each extracted frame in one video image file in which all frames are arranged. The "frame extraction position" will be described later, with reference to FIG. 8.

The values stored in the file data storage area 13h shown in FIG. 4 and the values stored in the layout data storage area 13i shown in FIG. 5 are no more than exemplary ones. These values do not pertain to the image list 20 illustrated in FIG. 3.

Figure 6:
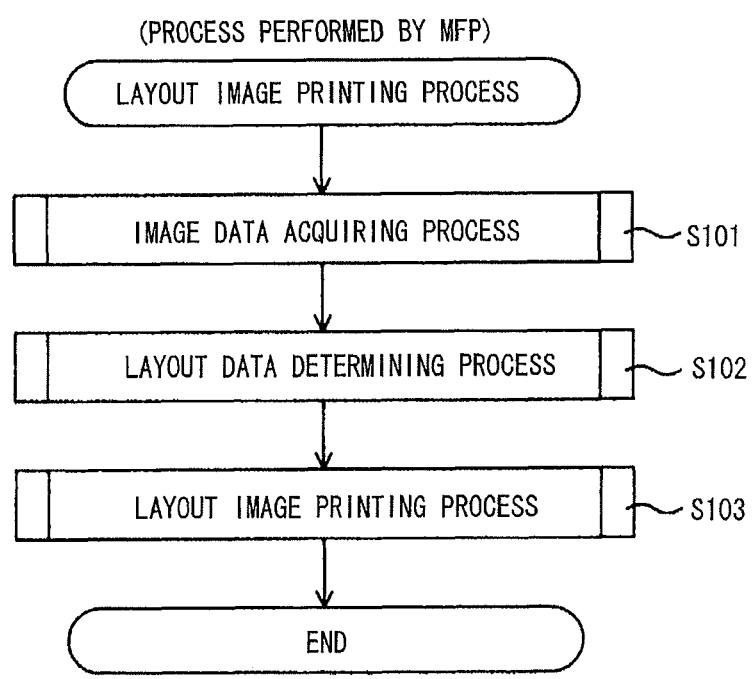
FIG. 6 is a flowchart explaining a layout image printing process.

FIG. 6 is a flowchart explaining the layout image printing process performed by the MFP 1. The layout image printing process is performed when the user inputs an instruction for starting the printing of the image list 20.

First, the MFP 1 performs the image data acquiring process for generating the file data records 200 to acquire data of each image file (S101). The image data acquiring process will be described later in detail with reference to FIG. 7.

Next, the MFP 1 performs the layout data determining process for generating the layout data 300 to determine the layout data of each frame (S102). The layout data determining process will be described later in detail with reference to FIG. 8.

Then, the MFP 1 performs the layout image printing process for printing the image list 20 in accordance with the layout data determined in S102 (S103). The layout image printing process will be described later in detail, with reference to FIGS. 9 to 13.

Figure 7:
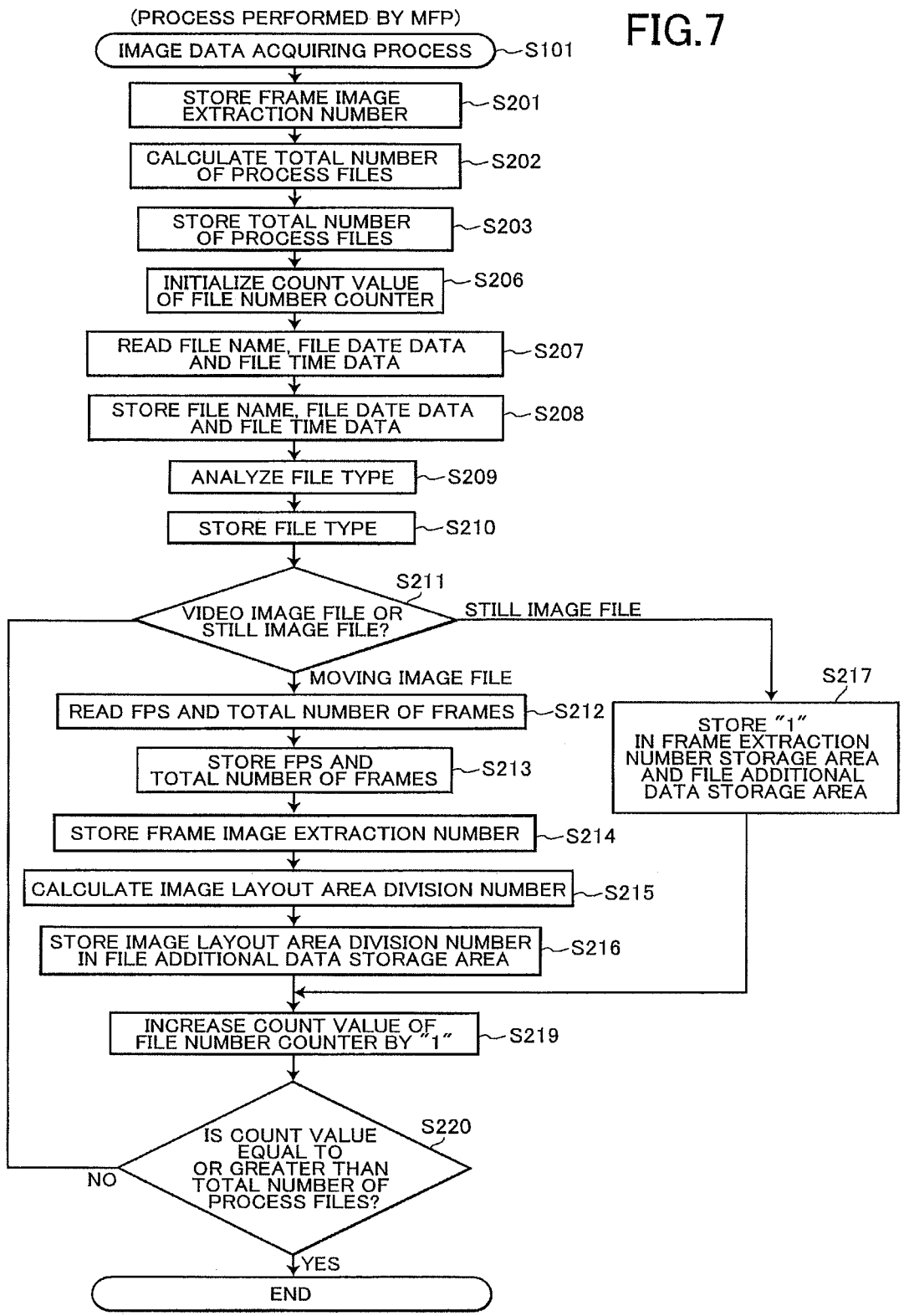
FIG. 7 is a flowchart explaining an image data acquiring process.

FIG. 7 is a flowchart explaining the image data acquiring process (S101). First, in the image data acquiring process, the MFP 1 stores the "frame image extraction number" in the frame number storage area 13a (S201). In the present embodiment, the user inputs the number of video image index images 22 to be formed for each video image file stored in the media card. In Step S201, the MFP 1 stores the value inputted by the user as the "frame image extraction number" in the frame number storage area 13a. Note that the MFP 1 may store the value inputted by the user as "frame image extraction number" in the frame number storage area 13a before beginning the image-data acquiring process.

Then, the MFP 1 calculates "total number of process files," i.e., the total number of still image files and video image files stored in the media card (S202), and stores the "total number of process files" in the process file number storage area 13b (S203).

Next, the MFP 1 performs a process for generating file data record 200 for each image file stored in the media card.

First, the MFP 1 initializes a count value of the file number counter stored in the counter storage area 13m to "0" (S206). The count value of the file number counter becomes the "file ID" of the image file processed below, and data acquired later are stored in an area corresponding to the "file ID" indicated by the count value of the file number counter.

The MFP 1 selects one image file among image files stored in the media card, and reads the "file name," "file date data" and "file time data" of the selected image file (S207), and stores the "file name," "file date data" and "file time data" in areas corresponding to the "file ID" indicated by the count value of the file number counter, respectively (S208). Specifically, the MFP 1 stores the "file name" in the file name storage area 202, the "file date data" in the file date data storage area 207, and the "file time data" in the file time data storage area 208.

The MFP 1 analyzes the "file type" of the selected image file based on, for example, the extension added to the file name (S209), and stores the "file type" in an area corresponding to the "file ID" indicated by the count value of the file number counter in the file type storage area 203 (S210).

The MFP 1 determines whether the selected image file is a video image file or a still image file based on the "file type" (S211).

If the selected image file is a video image file (S211: video image), the MFP 1 reads the "fps data" and the "total number of frames" constituting the video image file from the header of the video image file (S212), and stores the "fps data" in an area corresponding to the "file ID" indicated by the count value of the file number counter in the fps data storage area 206, and the "total number of frames" in an area corresponding to the "file ID" indicated by the count value of the file number counter in the total frame number storage area 205 (S213).

The MFP 1 reads the "frame image extraction number" stored in the frame number storage area 13a in Step S201, and stores the "frame image extraction number" in an area corresponding to the "file ID" indicated by the count value of the file number counter in the frame extraction number storage area 204 (S214).

Next, the MFP 1 calculates the "image layout area division number" based on the "frame extraction number" stored in the frame extraction number storage area 204 (S215). The "image layout area division number" is a value indicating the division number of the image layout area 23 allocated to each image file. An exemplary method of calculating the "image layout area division number" will be explained below.

First, the MFP 1 determines a value n satisfying the following condition 1:

(Condition 1)

$(n-1)^2 < \text{PickFrameNo} \leq n^2$

In the above formula, PickFrameNo is the "frame image extraction number."

Next, the MFP 1 substitutes n satisfying condition 1 into the following equation 1 to calculate the "image layout area division number":

$$\text{DivideNo} = n2 \quad \text{(Equation 1)}$$

In the above formula, DivideNo is the "image layout area division number."

Then, the MFP 1 stores the "image layout area division number" in an area corresponding to the "file ID" indicated by the count value of the file number counter in the file additional data storage area 209 (S216).

On the other hand, if the selected image file is a still image file (S211: still image), the MFP 1 stores the value "1" in an area corresponding to the "file ID" indicated by the count value of the file number counter in the frame extraction number storage area 204, and stores the value "1" in an area corresponding to the "file ID" indicated by the count value of the file number counter in the file additional data storage area 209 (S217).

Thus, one file data record 200 is set and stored in the file data storage area 13h. After performing either S212-S216 for the video image file or S217 for the still image file, the MFP 1 increases the count value of the file number counter by "1" (S219). The MFP 1 determines whether or not the count value of the file number counter is equal to or greater than the "total number of process files" stored in the process file number storage area 13b in S203 (S220).

If the count value of the file number counter is not equal to or greater than the "total number of process files" (S220: No), the process returns to Step S207, and Steps S207 to S220 are performed repeatedly to set and stores another file data record 200 in the file data storage area 13h. If the count value of the file number counter is equal to or greater than the "total number of process files" (S220: Yes), that is, if the file data records 200 for all image files have been generated and stored in the file data storage area 13h, the MFP 1 terminates the image data acquiring process (S101), and performs the next process, i.e., layout data determining process (S102).

Figure 8:
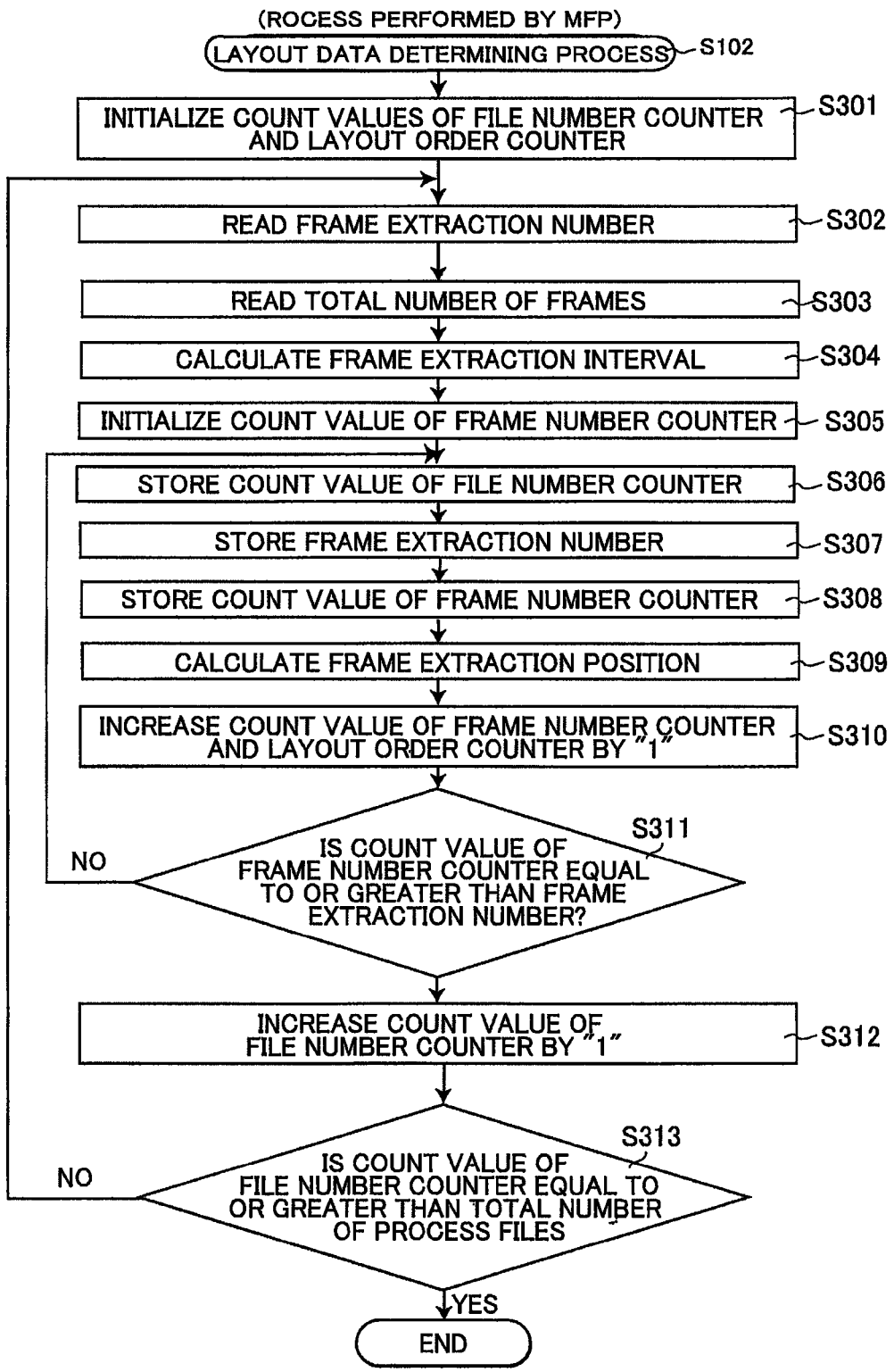
FIG. 8 is a flowchart explaining a layout data determining process.

FIG. 8 is a flowchart explaining the layout data determining process (S102). First, the MFP 1 initializes the count values of the file number counter and the layout order counter each stored in the counter storage area 13m to "0" (S301). The count value of the file number counter becomes the "file ID" of the image file processed below, and the layout order count becomes the "layout order" of the frame processed below.

Next, the MFP 1 reads the "frame extraction number" from an area corresponding to the "file ID" indicated by the count value of the file number counter in the frame extraction number storage area 204 (S302), and reads the "total number of frames" from an area corresponding to the "file ID" indicated by the count value of the file number counter in the total frame number storage area 205 (S303).

Subsequently, the MFP 1 calculates a "frame extraction interval" based on the "frame extraction number" and the "total number of frames" (S304). The "frame extraction interval" can be calculated by using, for example, the following equation 2:

$$\text{Frame extraction interval} = \text{total number of frames}/\text{frame extraction number} \quad \text{(Equation 2)}$$

Next, the MFP 1 initializes the count value of the frame number counter stored in the counter storage area 13m to "0" (S305), and stores the count value of the file number counter as the "file ID" in an area corresponding to the "layout order" indicated by the count value of the layout order counter in the file ID storage area 302 (S306).

The MFP 1 stores the "frame extraction number" read in Step S302 in an area corresponding to the "layout order" indicated by the count value of the layout order counter in the frame extraction number storage area 304 (S307).

Then, the MFP 1 stores the count value of the frame number counter in an area corresponding to the "layout order" indicated by the count value of the layout order counter in the extraction frame ordinal number storage area 305 (S308). The MFP 1 multiplies the count value of the frame number counter by the "frame extraction interval" calculated in S304 to calculate the "frame extraction position" indicating an arranged number of each extracted frame in one video image file in which all frames are arranged, and stores the "frame extraction position" in an area corresponding to the "layout order" indicated by the count value of the layout order counter in the frame extraction position storage area 306 (S309).

Next, the MFP 1 increases the count value of the frame number counter and the layout order counter by "1" (S310). Then, the MFP 1 determines whether or not the count value of the frame number counter is equal to or greater than the "frame extraction number" (S311). If the count value of the frame number counter is not equal to or greater than the "frame extraction number" (S311: No), the process returns to S306, and Steps S306 to S311 are repeated.

If the count value of the frame number counter is equal to or greater than the "frame extraction number" (S311: Yes), the MFP 1 increases the count value of the file number counter by "1" (S312), and determines whether or not the count value of the file number counter is equal to or greater than the "total number of process files" (S313). If the count value of the file number counter is not equal to or greater than the "total number of process files" (S313: No), the process returns to Step S302, Steps S302 to S313 are repeated. If the count value of the file number counter is equal to or greater than the "total number of process files" (S313: Yes), that is, if the layout data records 200 for all image files have been generated and stored in the layout data storage area 13i, the MFP 1 terminates the layout data determining process (S102), and performs the next process, i.e., the layout image printing process (S103).

FIG. 9 is a flowchart explaining the layout image printing process (S103). First, the MFP 1 reads, based on paper size and printing mode, a suitable "horizontal layout number" indicating the number of image layout areas 23 that can be horizontally assigned to one page of the image list 20, from the horizontal image layout number storage area 12b (S401).

Next, the MFP 1 reads, based on paper size and printing mode, a suitable "page layout number" indicating the number of image layout areas 23 that can be assigned to one page of the image list 20, from the page image layout number storage area 12c, calculates, based on the "page layout number", the "horizontal dimension" indicating the horizontal dimension of the image layout area 23 and the "vertical dimension" indicating the vertical dimension of the image layout area 23, and stores the "horizontal dimension" in the horizontal dimension storage area 13p and the "vertical dimension" in the vertical dimension storage area 13q (S402).

Figure 10:
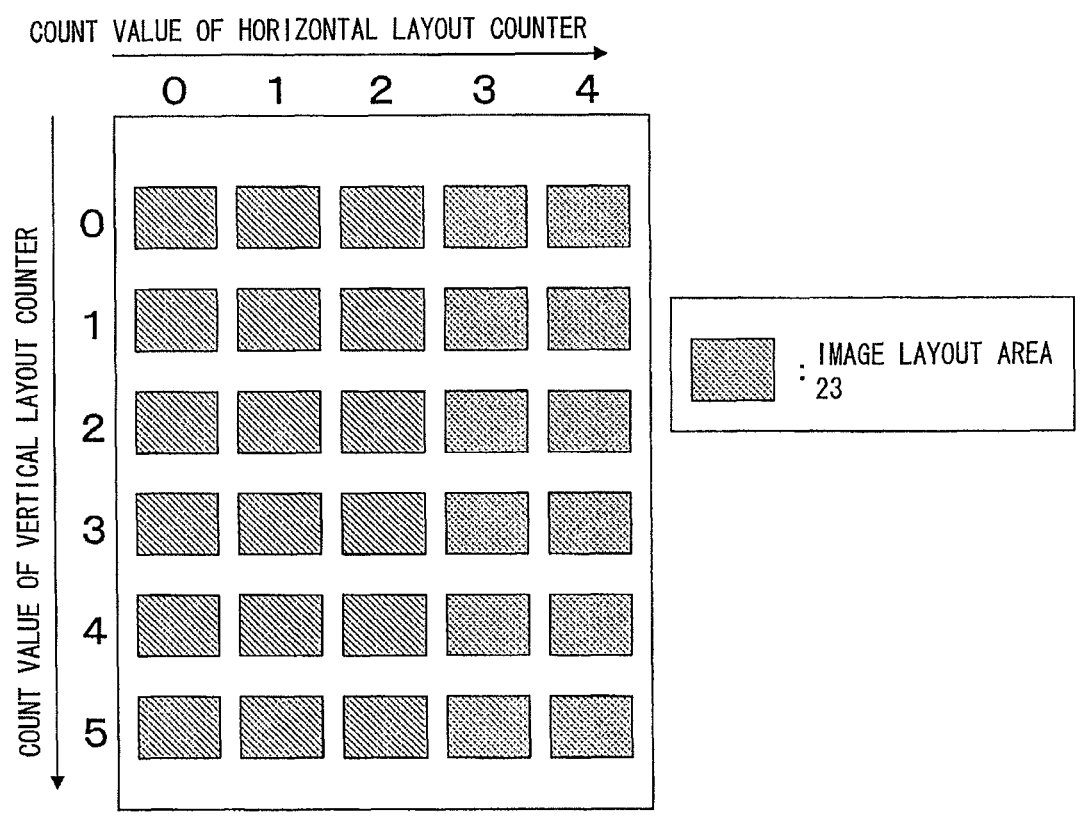
FIG. 10 is a diagram schematically illustrating an exemplary image layout area set on a one-page recording sheet.

FIG. 10 is a diagram schematically illustrating an exemplary image layout area 23 set on the one-page recording sheet. In the subsequent processes, one image layout area 23 is allocated to each image file. The image layout area 23 is merely an example and does not correspond to the image list 20 shown in FIG. 3.

In this embodiment, the image layout area 23 is identified by the count values of the horizontal layout counter and vertical layout counter stored in the counter storage area 13m. The count value of the horizontal layout counter indicates the horizontal position of the image layout area 23 in one recording sheet from the left of the recording sheet. The count value of the vertical layout counter indicates the vertical position of the image layout area 23 in one recording sheet from the top of the recording sheet.

Next, the MFP 1 reads the "total number of process files" from the process file number storage area 13*b* (S403), calculates the "page generation number" based on the "total number of process files" and the "page layout number", and stores the "page generation number" in the page generation number storage area 13*d* (S404).

In the present embodiment, the MFP 1 calculates the "page generation number," using the following equation 3:

Page generation number=(total number of process files/page layout number)+1    (Equation 3)

Then, the MFP 1 initializes the count value of the page counter stored in the counter storage area 13*m* to "1" (S405). Further, the MFP 1 calculates an "each page layout number" indicating the number of image layout areas 23 laid out in each recording sheet, based on the "total number of process files," the "page generation number," and the count value of the page counter (S406). In this embodiment, the MFP 1 calculates the "each page layout number," using the following equation:

When count value of page counter<page generation number;

Each page layout number=page layout number

When count value of page counter≧page generation number;

Each page layout number=total number of process files−(page layout number×(count value of page counter−1))

Next, the MFP 1 initializes the count values of the layout image counter, horizontal layout counter and vertical layout counter to "0" (S407). The MFP 1 reads the "file ID" and "frame extraction number" corresponding to the "layout order" indicated by the count value of the layout image counter from the layout data storage area 13*i* (S408).

The MFP 1 determines whether the image file identified by the "file ID" read in S408 is a video image file or a still image file (S409).

If the image file identified by the "file ID" is a video image file (S409: video image), the MFP 1 performs a frame-layout image generating process (S410). The frame layout image generating process (S410) is a process of generating video print data for generating the order of the video image index images 22 to be laid out in one image layout area 23. This process will be explained later in detail with reference to FIG. 12.

The MFP 1 lays out the video print data generated in Step S410 in an area corresponding to the image layout area 23 indicated by the count values of the horizontal layout counter and vertical layout counter in the layout buffer 13*n* (S411). In other words, the MFP 1 lays out the video image file that should be processed in one image layout area 23 thus specified.

On the other hand, if the image file identified by the "file ID" read in S408 is a still image file (S409: still image), the MFP 1 decodes the still image data (S412). Next, the MFP 1 enlarges or reduces the decoded still image data to the size of the image layout area 23, and lays out still print data indicating the enlarged or reduced still image data in the layout buffer 13*h* (S413). That is, the MFP 1 lays out the still image file that should be processed in one image layout area 23 indicated by the count values of the horizontal layout counter and vertical layout counter.

After processing either a video image file or a still image file as described above, the MFP 1 performs the process shown in FIG. 11.

FIG. 11 is a flowchart explaining the process following the layout image printing process (S103) shown in FIG. 9. In the process of FIG. 11, the MFP 1 increases the count value of the horizontal layout counter by "1" since one image file has been processed (S414). Then, the MFP 1 determines whether or not the count value of the horizontal layout counter is equal to or greater than the "horizontal layout number" (S415).

If the count value of the horizontal layout counter is equal to or greater than the "horizontal layout number" (S415: No), the MFP 1 increases the count value of the layout image counter by "1" (S419). Next, the MFP 1 determines whether or not the count value of the layout image counter is equal to or greater than the "page layout number" of the current recording sheet (S420). If the count value of layout image counter is not equal to or greater than the "page layout number" of the current recording sheet (S420: No), the process returns to Step S408 in FIG. 9. Then, the layout data representing the next layout order is processed.

When the process is repeated times corresponding to the "horizontal layout number," the count value of the horizontal layout counter becomes equal to or greater than the "horizontal layout number" (S415: Yes). Then, the MFP 1 transfers the print data stored in the layout buffer 13*n* to the printer 3 (S416), and the printer 3 prints the print data. No data is printed in any area for which the buffer stores no image data.

Then, the MFP 1 initializes the count value of the horizontal layout counter to "0" (S417), and increases the count value of the vertical layout counter by "1" (S418). Then, the processes in Steps S419 and S420 are performed.

When the printing process is thus completed for all image layout areas 23 set on the one-page recording sheet, the count value of the layout image counter becomes equal to or greater than the "page layout number" of the current recording sheet (S420: Yes). Next, the MFP 1 determines whether or not the layout buffer 13*n* holds any data not printed yet (S421). If the layout buffer 13*n* holds any data not printed yet (S421: Yes), the MFP 1 transfers the data not printed yet to the printer 3 (S422), and then, the process goes to Step S423. The printer 3 prints and outputs this data. If the layout buffer 13*n* does not hold any data not printed yet (S421: No), the process goes to Step S423, skipping Step S422.

The MFP 1 transmits a printing completion command indicating that the one-page data has been outputted to the printer 3 (S423), and increases the count value of the page counter by "1" (S424). Then, the MFP 1 initializes the count values of the horizontal layout counter and vertical layout counter to "0" (S425). The MFP 1 determines whether or not the count value of the page counter is greater than the "page generation number" (S426). If the count value of the page counter is not greater than the "page generation number" (S426: N), the process returns to Step S406 (FIG. 9), and the next page will be processed.

On the other hand, if the count value of the page counter is greater than the "page generation number" (S426: Yes), the MFP 1 terminates the layout image printing process (S103). Thus, the image list 20 described with reference to FIG. 3 is outputted.

Figure 12:
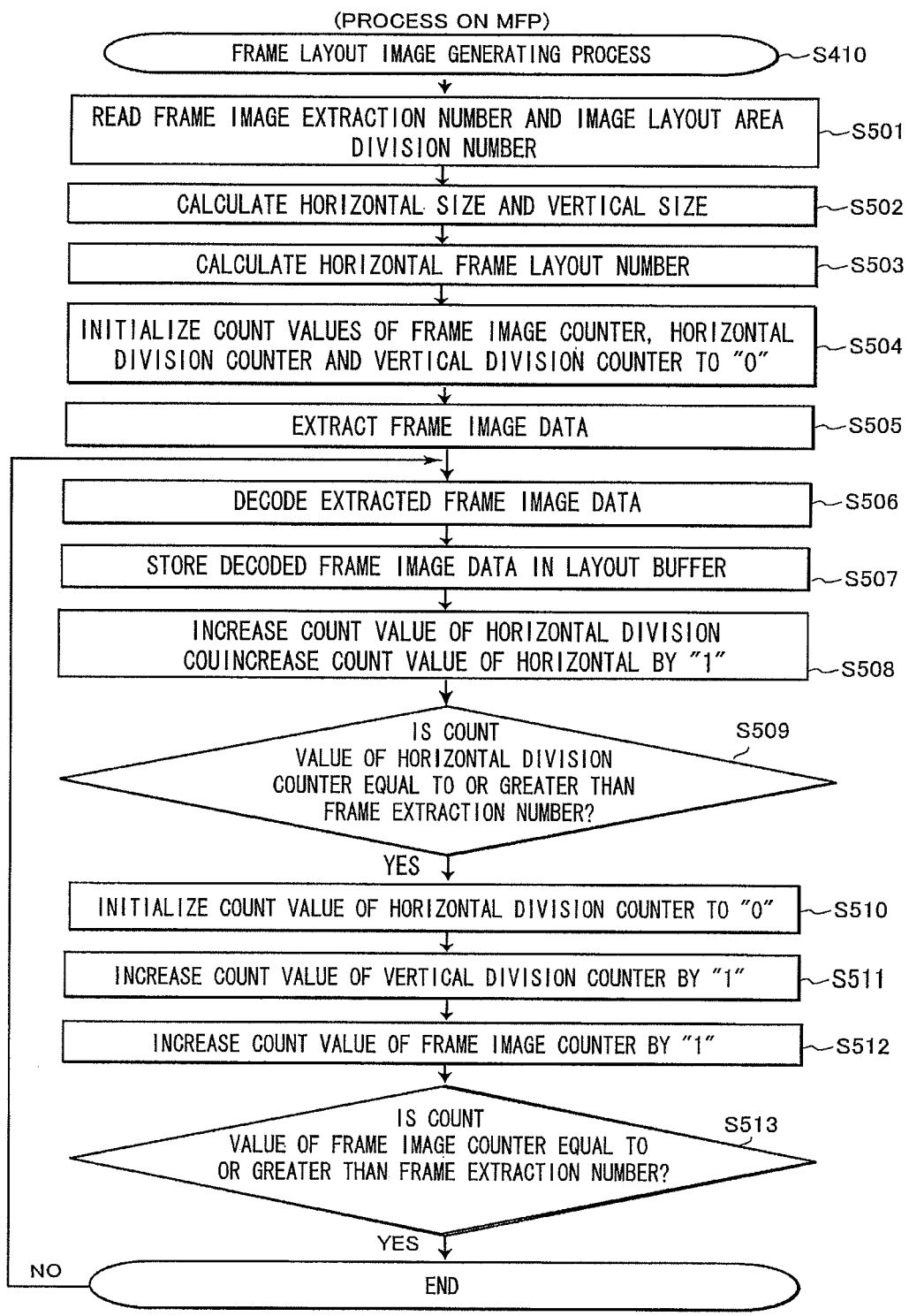
FIG. 12 is a flowchart explaining a frame layout image generating process.

FIG. 12 is a flowchart explaining the frame layout image generating process (S410). In the frame-layout image generating process, the MFP 1 extracts the frame image data to be processed from the video image, and lays out index images 22 corresponding to the extracted frame image data in the image layout area 23 allocated to the video image file.

First, the MFP 1 reads the "frame image extraction number" stored in the frame extraction number storage area 204 and the "image layout area division number" stored in the adjunctive file data storage area 209 each corresponding to the "file ID" indicated by the count of the file number counter (S501).

Figure 13:
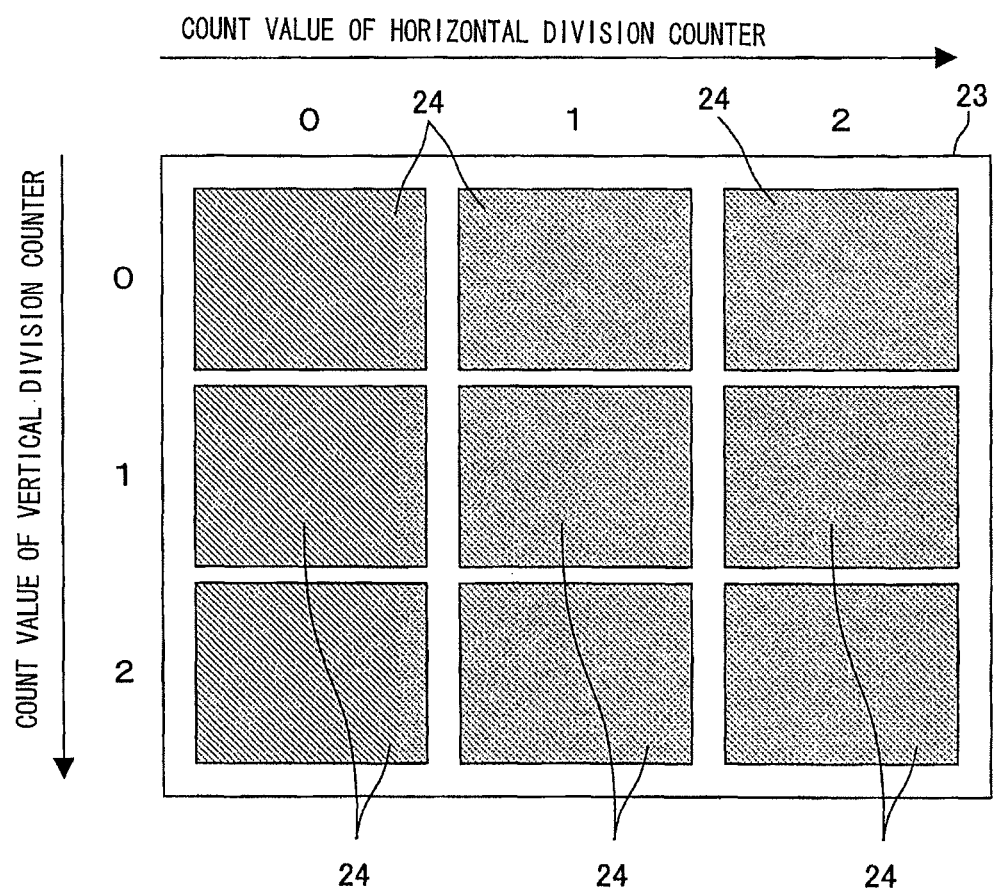
FIG. 13 is a diagram schematically illustrating sub-areas.

Sub-areas will be described with reference to FIG. 13. FIG. 13 is a diagram schematically illustrating sub-areas 24 formed by dividing an image layout area 23.

The frame image data extracted from the video image file are laid out in the sub-areas 24, respectively. As has been explained with reference to FIG. 3, one video image index image 22 is laid out in one sub-area 24.

In the present embodiment, the serial number of any sub-area 24, counted from the left of the image layout area 23 is specified by the count value of the horizontal division counter. Similarly, the serial number of any sub-area 24, counted from the top of the image layout area 23 is specified by the count of the vertical division counter.

As shown in FIG. 12, the MFP 1 calculates a "horizontal size" and "vertical size" of the video image index images based on the "image layout area division number" (S502). The "horizontal size" and "vertical size" of the video image index images may be calculated, using the following equation 4:

$$\text{Horizontal size} = (\text{horizontal dimension}/\text{image layout area division number})^{1/2}$$

$$\text{Vertical size} = (\text{vertical dimension}/\text{image layout area division number})^{1/2} \quad \text{(Equation 4)}$$

The "horizontal dimension" is stored in the horizontal storage area 13$p$. The data "vertical dimension" is stored in the vertical storage area 13$q$. As described above, the "image layout area division number" is proportional to the "frame extraction number." Hence, the greater the "frame extraction number," the smaller the size of each video image index image.

As a result, the printer 3 can output the video image index images 22 having the size determined for each video image data.

Next, the MFP 1 calculates a "horizontal frame layout number" in one image layout area 23 from the "image layout area division number" (S503), by using, for example, the following equation 5:

$$\text{Horizontal frames layout number} = \text{image layout area division number}^{1/2} \quad \text{(Equation 5)}$$

Next, the MFP 1 initializes the count values of the frame image counter, horizontal division counter and vertical division counter to "0" (S504).

The MFP 1 reads the "frame extraction position" from an area corresponding to the "frame extraction number" indicated by the count value of the frame image counter in the frame extraction position storage area 306, and extracts the frame image data specified by the "frame extraction position" (S505). As already pointed out, the "frame extraction position" indicating an arranged number of each extracted frame in one video image file in which all frames are arranged. Therefore, in Step S505, the MFP 1 extracts the frame image data representing the frame image identified by the "frame extraction position."

Next, the MFP 1 decodes the extracted frame image data (S506), and stores the decoded frame image data in the layout buffer 13$n$ (S507). Then, the MFP 1 increases the count value of the horizontal division counter by "1" (S508). The MFP 1 determines whether or not the count value of the horizontal division counter is equal to or greater than the "frame extraction number" (S509).

If the count value of the horizontal division counter is not equal to or greater than the "frame extraction number" (S509: No), the process will go to Step S512. In Step S512, the MFP 1 increases the count value of the frame image counter by "1." The MFP 1 determines whether or not the count value of the frame image counter is equal to or greater than the "frame extraction number" (S513). As long as the count value of the horizontal division counter is not equal to or greater than the "frame extraction number" (No in S513), Steps S505 to S513 are repeated.

When the count value of the horizontal division counter becomes equal to or greater than the "frame extraction number" (S509: Yes) as the process is repeated, the MFP 1 initializes the count value of the horizontal division counter to "0" (S510). Then, the MFP 1 increases the count value of the vertical division counter by "1" (S511). Subsequently, Steps S512 and S513 are performed.

When all frame image data to be extracted are extracted, the count value of the frame image counter becomes equal to or greater than the "frame extraction number" (S513: Yes). At this point, the frame-laid out image generating process is terminated.

In the frame layout image generating process according to this embodiment, the video image index images 22 are laid out from the upper-left sub-area 24 in one image layout area 23, in the ascending order of frame numbers. The frames to be extract are laid out so that the greater the number of any frame, the later the frame image data will be extracted (see S309 in FIG. 8). The video image index images 22 pertaining to a video image file are therefore laid out in one image layout area 23, in the order in which the frame image data will be reproduced (see FIG. 3).

The user can therefore view the video image index images 22 that are laid out in the image layout area 23, one after another in the order in which the frame image data will be reproduced. This helps the user to easily understand the content of the video image file.

Although the present invention has been described with respect to specific embodiments, it will be appreciated by one skilled in the art that a variety of changes may be made without departing from the scope of the invention.

For example, while the image list 20 is printed on recording paper in the preferred embodiment, the present invention may also be applied to a case in which the image list 20 is displayed on the LCD 5 or another display unit.

The present invention may also be applied to a personal computer, for example, whereby the image list 20 is displayed on the monitor of the personal computer or is printed out on a printer through control by the personal computer.

Although the image list 20 for all image files are printed in the preferred embodiment described above, the image list 20 for image files selected by the user may be printed.

In the preferred embodiment described above, both the video files and the still image files are generated through digital photography, but the present invention may be applied to video files and still image files generated according to another method.

Further, while still image files and video files are combined on the media card in the preferred embodiment described above, the present invention may also be applied to a case in which only video files are stored on the media card.

Further, while image data stored on a writable media card is the target of processing in the preferred embodiment, the present invention may also be applied when targeting image data stored in internal memory of the MFP 1.

In the present embodiment, the user inputs the data designating the number of video image index images 22 to be formed for each video image file. Instead, the MFP 1 may determine the number of video image index images 22 to be formed, based on data specific to the video image file.

For example, the MFP 1 may have a means for acquiring record length data representing the period for recording each video image file, and a number of frame images to be extracted may be stored in the frame extraction number storage area 204 (see FIG. 4). The number of frame images to be extracted is of such a value that the longer the period for recording the video image file, the more video image index images 22 will be laid out in the image layout area 23 that is provided for the video image file.

Thus, the longer the period of recording a video image file, the more video image index images 22 will be laid out in the image list 20. Since any video image file recorded over a long period of time is considered to represent many scenes, many video image index images 22 are laid out in the image list 20. This helps the user to understand correctly the content of the video image file.

The MFP 1 may have a means for acquiring data representing the number of times the scene has been switched from one to another in each moving picture file. In this case, the number of video image index images to be laid out in one image layout area 23 may be determined so that the more times the scene is switched in the moving picture file, the more video image index images 22 will be laid out in the image list 20.

Thus, many video image index images 22 are laid out in the image list 20 for any video image file in which the scene is switched many times. Since many video image index images 22 are laid out in the image list 20 for the video image file in which the scene is switched many times, the user can correctly recognize the many scenes included in the video image file.

For example, the change in the color (pixel value) of each frame image may be calculated, and the scene may be found to have been switched to another when the color change exceeds a prescribed threshold. The data representing the number of times the scene has been switched can be thereby acquired.

In the embodiment described above, the "horizontal layout number" and the "page layout number" are preset in accordance with the size of the recording sheet and the print resolution. Instead, the positions and sizes of the image layout areas 23 may be set in accordance with the total number of the still image files and video image files that should be outputted to the image list 20 and with the size of the recoding sheet, so that the image layout areas 23 may have the same size. The sizes of still-image index images and the sizes of the video image index images may be set in accordance with the size of each image layout area 23. Then, the image layout areas 23 can have an appropriate size and can be orderly laid out, providing an image list that is easy to view.

The size of each image layout area 23, which is set at this point, should better be the largest possible so that the entire image file may be printed on the recording sheet having a limited size. With various images orderly laid out, the image list easy for the user to view can be output. Further, since each image is output in the largest size possible, the user can easily understand the content of the image. In this respect, too, the image list can be output as an easily viewable manner.

In the embodiment described above, the video image index images 22 are laid out in the order in which they will be reproduced. Nonetheless, the images 22 may be laid out in a specific order in accordance with any other condition, such as the number of faces appearing in each image, the dynamic range of each image, or the overall luminance of each image.

What is claimed is:

1. An image processor configured to connect with a storing medium storing still image data corresponding to a still image and moving image data corresponding to a moving image, the moving image data comprising a plurality of sets of frame image data corresponding to a plurality of frame images respectively, comprising:
    an outputting unit configured to output an image list having a first layout area having a first layout size and a second layout area having a second layout size comprising a first size along a first direction and a second size along a second direction perpendicular to the first direction;
    an extracting unit configured to extract at least two sets of frame image data from the plurality of sets of frame image data;
    an index image producing unit configured to produce a first index image from the still image data and produce a plurality of second index images from the extracted frame image data;
    a layout unit configured to lay out the first index image in the first layout area and the plurality of second index images in the second layout area,
    a layout number determining unit configured to determine a first image layout number and a second image layout number for the second layout area based on the number of extracted frame images, the second layout area being divided into a number of regions corresponding to the first image layout number along the first direction and being divided into a number of regions corresponding to the second image layout number along the second direction, the plurality of the second index images configured to be allocated to the divided second layout area; and
    a size determining unit configured to determine a size of each of the plurality of second index images based on the first image layout number, the second image layout number, the first size of the second layout area, and the second size of the second layout area,
    wherein the layout unit is configured to lay out the plurality of second index images based on the size of each of the plurality of second index images determined by the size determining unit, and
    wherein the layout number determining unit is configured to determine a number n, which corresponds to the first image layout number and the second image layout number, and which satisfies the condition:
    $(n-1)^2 <$ the number of the extracted frame images $\leq n^2$.

2. The image processor according to claim 1, wherein the size of each second index image is in reverse proportion to the number of the extracted frame images.

3. The image processor according to claim 1, wherein the moving image data has order data indicating an order at which the plurality of frame images is continuously reproduced as the moving image, and the layout unit lays out the plurality of second index images in the second layout area in accordance with the order data.

4. The image processor according to claim 1, wherein the moving image data has a record time, and the number of the extracted frame images is in proportion to the record time.

5. The image processor according to claim 1,
    wherein the moving image data has a plurality of scenes each including at least one of the plurality of frame images, the scene being switched when a frame image belonging to one scene is reproduced following a frame belonging to another scene, and wherein the number of the extracted frame images is in proportion to a times the scene is switched.

6. The image processor according to claim 1, wherein the first layout size is equal to the second layout size, and wherein the index image producing unit produces the first image having a first index size based on the first layout size, and produces the plurality of second index images each having a second index image size, which corresponds to the size of each second index image, based on the second layout size.

7. The image processor according to claim 6, wherein each of the plurality of second index images has a second index image size, which corresponds to the size of each second index image, equal to each other.

8. The image processor according to claim 6, further comprising a layout size determining unit configured to determine the first layout size and the second layout size based on the number of the still image data and the moving image data that are used to produce the first index image and the second index image by the index image producing unit.

9. The image processor according to claim 1, wherein the outputting unit prints the image list.

10. The image processor according to claim 1, wherein the index image producing unit further produces a third index image in which the plurality of second index images is arranged, and the layout unit lays out the third index image in the second layout area.

* * * * *